(12) United States Patent
Esmaeili et al.

(10) Patent No.: US 9,758,733 B2
(45) Date of Patent: Sep. 12, 2017

(54) SEPARATION OF ASPHALTENES

(71) Applicants: Payman Esmaeili, Calgary (CA); Jason W. Lachance, Magnolia, TX (US); Brendon L. Keinath, Houston, TX (US)

(72) Inventors: Payman Esmaeili, Calgary (CA); Jason W. Lachance, Magnolia, TX (US); Brendon L. Keinath, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 70 days.

(21) Appl. No.: 14/885,547

(22) Filed: Oct. 16, 2015

(65) Prior Publication Data
US 2016/0137928 A1 May 19, 2016

Related U.S. Application Data

(60) Provisional application No. 62/081,164, filed on Nov. 18, 2014.

(51) Int. Cl.
*C10G 29/20* (2006.01)
*C10G 29/22* (2006.01)
*E21B 43/36* (2006.01)
*C09K 8/524* (2006.01)

(52) U.S. Cl.
CPC ............. *C10G 29/20* (2013.01); *C09K 8/524* (2013.01); *C10G 29/22* (2013.01); *E21B 43/36* (2013.01)

(58) Field of Classification Search
CPC ........ C10G 29/20; C10G 29/22; C09K 8/524; E21B 43/36
See application file for complete search history.

(56) References Cited

U.S. PATENT DOCUMENTS

| | | | |
|---|---|---|---|
| 2,438,874 A | 3/1948 | Meadow et al. | 196/22 |
| 3,380,521 A | 4/1968 | Friedman | 166/8 |
| 6,656,366 B1 | 12/2003 | Fung et al. | 210/737 |
| 6,884,347 B1 * | 4/2005 | Krieger | C02F 1/24 210/201 |
| 2005/0194292 A1 * | 9/2005 | Beetge | C10G 33/04 208/391 |
| 2006/0196812 A1 * | 9/2006 | Beetge | C10G 1/045 208/435 |

(Continued)

FOREIGN PATENT DOCUMENTS

| DE | 10027415 | 6/2000 | B01D 17/02 |
|---|---|---|---|

OTHER PUBLICATIONS

Moschopedis, S. E. et al. (1974) "Influence of Certain Metal Salts on the Solubility of Petroleum Asphaltenes," Fuel, IPC Science & Technology Press, v. 53, No. 3, Jul. 1, 1974, pp. 2220223.

(Continued)

*Primary Examiner* — Randy Boyer
*Assistant Examiner* — Juan Valencia
(74) *Attorney, Agent, or Firm* — ExxonMobil Upstream Research Company

(57) ABSTRACT

An asphaltenes separation system comprising a flocculant feed system configured to add a flocculant to a production fluid to flocculate asphaltenes in the production fluid, and an asphaltenes separator configured to remove flocculated asphaltenes from the production fluid.

22 Claims, 7 Drawing Sheets

(56) References Cited

U.S. PATENT DOCUMENTS

| | | | |
|---|---|---|---|
| 2006/0260980 A1* | 11/2006 | Yeung | C10G 21/003 196/46 |
| 2008/0156700 A1 | 7/2008 | Abulnaga et al. | 208/251 |
| 2011/0266198 A1* | 11/2011 | Hassan | B03D 1/02 208/390 |
| 2014/0054201 A1* | 2/2014 | Adeyinka | C10G 1/04 208/390 |

OTHER PUBLICATIONS

Pillon, Lilianna (2001) "Effect of Dispersants and Flocculants on the Collodial Stability of Asphaltenes," Petroleum Science & Technology, v. 19, No. 7-8, Jan. 1, 2001, pp. 863-873.

* cited by examiner

200

300

312

SEPARATION OF ASPHALTENES

CROSS SECTION TO RELATED APPLICATIONS

This application claims the priority benefit of U.S. provisional patent application No. 62/081,164 filed Nov. 18, 2014 entitled SEPARATION OF ASPHALTENES, the entirety of which is incorporated by reference herein.

FIELD

Disclosed techniques relate to oil and gas production, and more particularly, to subsea oil and gas production. Still more particularly, the disclosed techniques relate to the removal of asphaltenes from oil and gas production operations.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Asphaltenes may be problematic in oil in production fluids. Asphaltenes are generally dissolved in production fluids at typical reservoir pressures and temperatures. However, the asphaltenes may precipitate and drop out of production fluid as pressure is reduced in the conveyance and processing of the production fluid. Asphaltene deposits may foul piping and equipment, including wellhead equipment, pipelines, surface facilities, process piping, downstream refining operations, and so forth. Conventional remediation includes solvent washing or mechanical treatment of piping and equipment to remove the deposited asphaltenes. Remediation may alternately or additionally include the addition of chemical dispersants to the production fluid to hinder precipitation of the asphaltenes. These solutions carry certain disadvantages, for example, a solvent wash may require several hours of downtime and may introduce significant cost and environmental concerns associated with the solvents. Further, it may be difficult to consistently add chemical dispersants to the production fluid to avoid deposition because the operating region of precipitation of the asphaltenes may vary and, in some instances, may occur prior to addition of the chemical dispersant. In part due to this lack of consistent asphaltenes, the efficiency of the treatment may vary as process factors such as composition, pressure/temperature profiles, etc., change.

As a result of the above, a need exists for a technique to minimize or eliminate asphaltene deposits that does not suffer the drawbacks of the conventional remediation approach of adding chemical dispersants.

SUMMARY

This disclosure includes an asphaltenes separation system comprising a flocculant feed system configured to add a flocculant to a production fluid to flocculate asphaltenes in the production fluid, and an asphaltenes separator configured to remove flocculated asphaltenes from the production fluid.

This disclosure also includes a separation system comprising a flocculating agent feed system configured to add a flocculating agent to a conduit conveying production fluid from a subsea wellhead, wherein the production fluid comprises hydrocarbon, and an asphaltenes separator operationally coupled to the conduit and configured to receive the production fluid, remove flocculated asphaltenes from the production fluid, discharge an asphaltenes stream comprising the flocculated asphaltenes, and discharge a product comprising the production fluid.

This disclosure further includes a method for separating asphaltenes from a production fluid comprising receiving the production fluid from a wellhead, the production fluid comprising hydrocarbon and asphaltenes, adding a flocculation stream to the production fluid, mixing the flocculation stream with the production fluid to precipitate asphaltene flocs flowing in the production fluid, and separating the asphaltene flocs from the production fluid.

DESCRIPTION OF THE DRAWINGS

The advantages of the present techniques are better understood by referring to the following detailed description and the attached drawings, in which.

DETAILED DESCRIPTION

Figure 1:
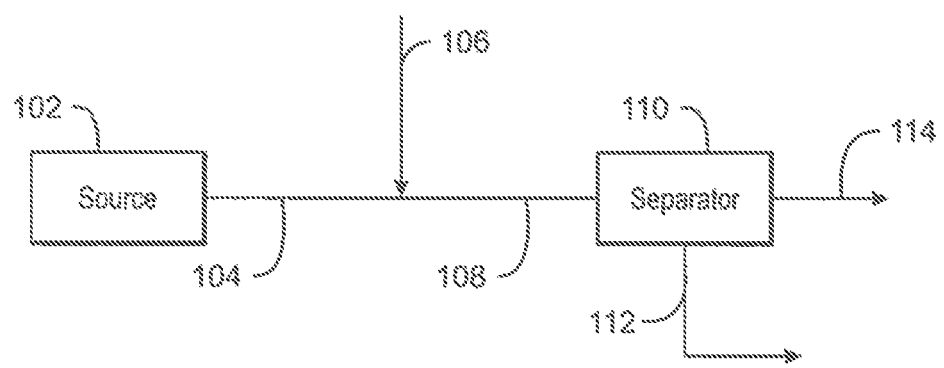
FIG. 1 is a schematic diagram of a hydrocarbon production system.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

As used herein, the term "exemplary" means serving as an example, instance, or illustration. Any embodiment described herein as "exemplary" is not to be construed as preferred or advantageous over other embodiments.

As used herein, the term "gas" is used interchangeably with "vapor," and means a substance or mixture of substances in the gaseous state as distinguished from the liquid or solid state. Likewise, the term "liquid" means a substance or mixture of substances in the liquid state as distinguished from the gas or solid state. As used herein, "fluid" is a generic term that may include a liquid, a gas, or vapor, or any combination thereof.

As used herein, the term "hydrocarbon" is an organic compound that primarily includes the elements hydrogen and carbon although nitrogen, sulfur, oxygen, metals, or any number of other elements may be present in small amounts. As used herein, hydrocarbons generally refer to organic materials that are transported by pipeline, such as any form of natural gas or oil. A "hydrocarbon stream" is a stream enriched in hydrocarbons by the removal of other materials such as water, solids, and/or any additive.

As used herein, the term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($C_1$) as a significant component. Raw natural gas will also typically contain ethane ($C_2$), higher molecular weight hydrocarbons, which may be collectively referred to herein as "heavy hydrocarbons," one or more acid gases (such as carbon dioxide, hydrogen sulfide, carbonyl sulfide, carbon disulfide, and mercaptans), and minor amounts of contaminants such as water, nitrogen, and crude oil.

As used herein, the term "pressure" is the force exerted per unit area by the gas on the walls of the volume. Pressure can be shown as pounds per square inch (psi).

"Atmospheric pressure" refers to the local pressure of the air. "Absolute pressure" (psia) refers to the sum of the atmospheric pressure (14.7 psi at standard conditions) plus the gauge pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning. For a pure component in an enclosed system at a given pressure, the component vapor pressure is essentially equal to the total pressure in the system.

As used herein, the term "production fluid" refers to a liquid and/or gaseous stream removed from a subsurface formation, such as an organic-rich rock formation. Produced fluids may include both hydrocarbon fluids and non-hydrocarbon fluids. For example, production fluids may include, but are not limited to, oil, natural gas and water.

As used herein, the term "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "well" or "wellbore" refers to a hole in the subsurface made by drilling or insertion of a conduit into the subsurface. The terms are interchangeable when referring to an opening in the formation. A well may have a substantially circular cross section, or other cross-sectional shapes (for example, circles, ovals, squares, rectangles, triangles, slits, or other regular or irregular shapes). Wells may be cased, cased and cemented, open-hole well, etc., and may be any type, including, but not limited to, a producing well, an experimental well, an exploratory well, or the like. A well may be vertical, horizontal, or any angle between vertical and horizontal (a deviated well), for example a vertical well may include a non-vertical component.

In subsea oil and gas production operations, asphaltenes in production fluids can cause flow assurance issues, such as the fouling of flow lines and process equipment. Prior art approaches to solving the problem of asphaltenes included using dispersants to prevent agglomeration. Techniques described herein including using flocculants to encourage or promote the flocculation of asphaltenes in comparatively small agglomerations rather than dispersal. When flocculated, asphaltene "stickiness" may be decreased. Advantageously, such techniques may accommodate size and weight restrictions imposed on deep-water processing units. In general, the techniques described herein may achieve removal of flocculated asphaltenes molecules from production fluids. The flocculated asphaltene removal may improve the flow assurance aspect of the production fluid by reducing asphaltenes fouling of piping and equipment.

Asphaltenes are polar colloidal particles typically with relatively large surface area. Asphaltene particles may agglomerate. In the presence of a flocculant, asphaltene particles may bond and form flakes or clusters having a reduced surface area in comparison to agglomerated asphaltenes. Therefore, the flocculated asphaltenes may have a reduced activity or a reduced tendency to stick to pipewall or process equipment. Including sand in the production fluid of the flocculated systems may increase the effectiveness of asphaltene flocculation, e.g., by providing a site for flocculation to occur.

In some embodiments, the production fluid having the flocculated asphaltenes may be conveyed to surface facilities where the flocculated asphaltenes are separated from the production fluid. The motive force for transport to the surface may be, for example, wellhead pressure. In other embodiments, the flocculated asphaltenes may be separated from the production fluid at the subsea level such as near the subsea wellhead. In such examples of subsea separation, a production fluid substantially free of asphaltenes may discharge from the subsea separation system and may be transported (e.g., in a conduit) from the subsea wellhead area to surface facilities. Prior to reaching the surface facilities, the production fluid may be subjected to additional subsea processing, such as water removal. The motive force for conveyance of the processed production fluid to the surface may be, for example, the wellhead pressure. As discussed below, the separated and removed asphaltenes from the production fluid may be transported (e.g., in another conduit) from the subsea separation to the surface facilities. In particular examples, water or a hydrotransport may be employed to facilitate conveyance of the separated solid asphaltenes particles or clusters to the surface.

FIG. 1 is a schematic diagram of an asphaltenes separation system 100 operationally coupled to a source 102, e.g., a subsea wellhead, of a fluid 104, e.g., a production fluid, having asphaltenes. The fluid 104 may comprise some sand. In another example, the source 102 is a high-pressure storage of oil, and the fluid 104 is oil. The fluid 104 may generally discharge from the source 102 through a conduit to a downstream separator.

In the illustrated embodiment, the asphaltenes separation system 100 adds a flocculation stream 106 comprising a flocculation agent to the fluid 104, e.g., via the conduit conveying the fluid 104. Therefore, the interface for the addition of the flocculation stream 106 to the fluid 104 may be, for example, a conduit tee.

In certain embodiments, the flocculation stream 106 is a flocculant or flocculating agent, such as a polymeric flocculating agent, that promotes flocculation and agglomeration of asphaltenes in the fluid 104. The flocculating agent may be anionic cationic, or nonionic. The flocculating agent may comprise an oil-soluble polymer, a water-soluble polymer, or both. Suitable water-soluble flocculants include high-molecular weight polyacrylamides (PAM), hydrolyzed polyacrylamide (HPAM), etc., and nonionic polyethylene oxide homopolymer. Water-soluble flocculant(s) may be dissolved in water before addition or injection. In embodiments using oil-soluble flocculants, the oil-soluble flocculants may be mixed with oil prior to addition or injection to the production fluid. The mixing of the flocculant with oil or water may be performed in a flocculant feed system or upstream of the flocculant feed system.

Further, another production fluid (e.g., having oil and gas) may be added to the flocculation stream 106 to assist in blending the fluid 104. Such gas may be natural gas, methane, inert gas, or other gas. Such additions may change the overall oil composition in the production fluid, for example, to promote precipitation and/or flocculation of asphaltenes. However, while adding gas may facilitate asphaltene precipitation, the addition of gas to the production fluid may increase the bubble point and asphaltenes onset pressure (AOP) of the production fluid in certain instances. In certain examples, the composition of the injection gas may be adjusted to reduce an associated increase in production-fluid bubble point and AOP, and to advance precipitation of the asphaltenes.

Sand may be added along with flocculant to promote the flocculation of asphaltene molecules or "flocs." The sand may be selected to obtain various performance characteristics, e.g., varying the sand grain size and/or quantity of the added sand to reduce sedimentation or plugging in the flowline, to improve flocculation, etc. The sand content should generally not be too high which may degrade or break the flocs due to the friction between large particles, for example. Further, excessive amounts of sand could adversely affect flow of the production fluid. Further, in cases with the fluid 104 having greater amounts of sand that inhibit the asphaltenes from precipitating or dropping out of suspension, sand may be removed.

Stickiness of asphaltenes can be due to high surface activity, which may be proportional to the surface area of the asphaltenes particles. The activity of the solid asphaltenes and likelihood that asphaltenes stick to walls of conduits or equipment may be decreased by reducing the available surface area of the asphaltenes particles. The flocculant may facilitate formation of larger particles or clusters of the asphaltenes by binding asphaltene particles to itself, thereby reducing the available surface area, and thus stickiness, of the asphaltenes. Any sand present may provide anchor sites to further promote agglomeration and reduction of surface area and stickiness of the asphaltenes particles.

In some examples, the addition rate of the flocculation stream 106, in some embodiments a portion thereof, e.g., flocculant, sand, gas, etc., may be modulated or regulated by a control system when adding the flocculation stream 106 to the fluid 104. The control system may include control valves, instrumentation, computers, computer memory, a processor, and so forth. The control system may adjust the flow rate or addition rate of the flocculation stream 106 in response to the effectiveness of the separation 110 operation, the level of any asphaltenes fouling of piping and equipment, and so on. The addition rate of the flocculation stream 106 may be adjusted to promote the desired morphology of the formed solids having asphaltenes, e.g., to reduce the active surface area of the asphaltenes, to provide voids (for production fluid) in the asphaltenes clusters, to promote a density difference between the solid asphaltenes versus the production fluid, etc. Mixing the fluid 104 and the flocculation stream 106 may create a mixture 108.

In concert with, or in lieu of, the addition of a flocculation stream 106, a controlled pressure drop of the fluid 104 may be implemented (not shown) to induce precipitation of asphaltenes. The pressure reduction may place the fluid 104 into an operating "unstable" region with respect to asphaltenes and thus promote precipitation of solid asphaltenes particles in the fluid 104. The pressure reduction may be implemented by a reduction in diameter of the conduit conveying the fluid 104. The pressure reduction may be implemented via a restriction orifice, valve, and so forth. In examples of a valve employed to provide for a pressure drop of the fluid 104, the valve may be a choke valve. In cases with the source 102 as a wellhead, the choke valve may be a second choke valve in addition to a choke valve typically employed at the wellhead.

The mixture 108 is conveyed to a separator 110. Flow shear forces in the conduit transporting the mixture 108 may advance mixing of components in the mixture 108 to further promote formation of asphaltenes particles from solution or suspension. Additionally, an inline mixer (not shown) such as a static mixer or agitated vessel may further promote mixing of the mixture 108 in route to the separator 110. In general, a unit operation such as an inline mixer, vessel, agitated vessel, and the like, may optionally be applied to give additional residence time and mixing of the mixture 108 in route to the separator 110. Further, the separator 110 may serve as a pressure reduction device to provide for a controlled pressure drop, as discussed above.

The separator 110 removes asphaltenes 112 from the mixture 108 and fluid 104. The separator 110 may be a hydrocyclone or other type of separator that separates asphaltenes 112 solid particles or clusters from the fluid 104. Also, the separator 110 may include more than one separator. Further, the separator 110 may also remove sand with the asphaltenes. Thus, the asphaltenes 112 may include sand. Whether performed subsea or at the surface, the separation may be promoted by differences between density of the flocculated asphaltenes clusters versus density of the production fluid. Further, certain sizes of the flocculated asphaltenes may promote separation from the production fluid. The asphaltenes clusters can be engineered to have a particular density and size. Indeed, the types and dosages of the flocculant may be selected to give a desired morphology of the flocculated asphaltenes clusters. Exemplary values and ranges of specific gravity for components in the production fluid include about 0.8 to about 1.1 for oil, about 0.8 to about 1.1 or about 1.0 for water, about 1.5 to about 3 or about 2.5 for sand, and about 0.8 to 1.1 for asphaltenes. Such exemplary values and ranges for specific gravity are not intended to limit embodiments of the present techniques.

The product 114 from the separator 110 may be a more purified fluid 104, or a fluid 104 substantially free of asphaltenes or with a reduced amount of asphaltenes. In cases of the fluid 104 as production fluid, the product 114 from the separator 110 may be a more purified production fluid, or a production fluid substantially free of asphaltenes or with a reduced amount of asphaltenes. The separator product 114 as production fluid may include oil, gas, other hydrocarbons, water, and so on. In the example of the source 102 as a subsea wellhead, the separator 110 may be disposed, located, or placed subsea near the wellhead, or the separator may be disposed at surface facilities. The motive force to and through the separator 110 may include source 102 pressure, a pump or other motive device, or other motive forces.

Figure 2:
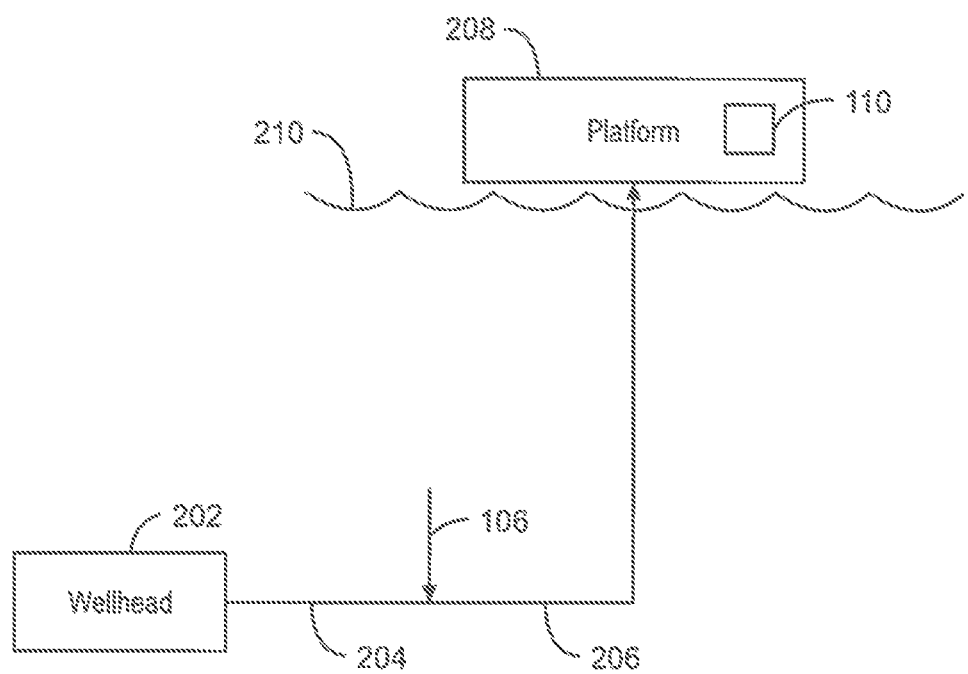
FIG. 2 is a schematic diagram of a hydrocarbon production system.

FIG. 2 is a schematic diagram of an asphaltenes separation system 200, e.g., the asphaltenes separation system 100 of FIG. 1, coupled to a subsea wellhead 202 discharging production fluid 204. Like numbered items are as described with respect to FIG. 1. In the example of FIG. 2, the wellhead 202 may be analogous to the source 102 of FIG. 1, the production fluid 204 may be analogous to the fluid 104 of FIG. 1, and the separation feed 206 may be analogous to the mixture 108 of FIG. 1.

The asphaltenes separation system 200 receives the production fluid 204 from the subsea wellhead 202. The separation system 200 adds a flocculation stream 106 to the production fluid 204 to form asphaltenes particles in the production fluid 204. The mixture of production fluid 204 having solid asphaltenes and any residual flocculation stream 106 is sent as a separation feed 206 to a separator 110 to remove the precipitated or flocculated asphaltenes from the production fluid 204. In the illustrated embodiment, the separator 110 is located on a collection platform 208, such as a floating production storage and offloading (FPSO) unit, at the surface 210. The collection platform 208 may be anchored to the sea floor by a number of tethers, and may receive production fluid from multiple subsea wellheads on the ocean floor. In alternate embodiments, the separator 110 may optionally be disposed subsea within the scope of this disclosure.

Onboard the collection platform 208, the separator 110 removes asphaltenes from the separation feed 206 and production fluid 204. The wells underlying the wellheads may include single wellbores or multiple, branch wellbores. The collection platform 208 may have equipment for dehydration, purification, and other processing, such as liquefaction equipment to form purified hydrocarbons for storage in vessels. The collection platform 208 may transport processed production fluid and hydrocarbon to shore facilities by pipeline (not shown).

Figure 3:
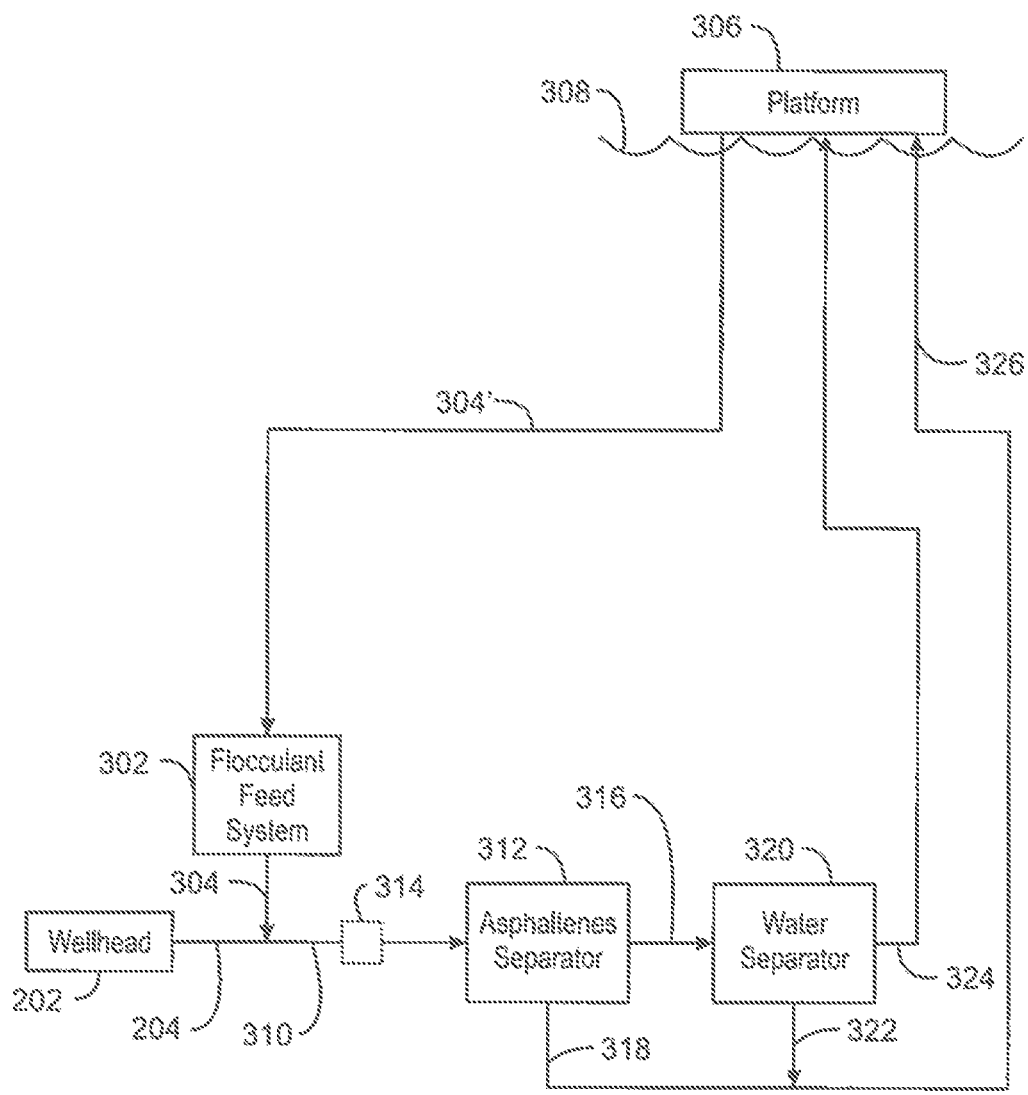
FIG. 3 is a schematic diagram of an embodiment of a hydrocarbon production configuration having a flocculant addition system and an asphaltenes separation system.

FIG. 3 is a schematic diagram of a separation system 300, e.g., the separation system 200 of FIG. 2, operationally coupled to a wellhead 202. Like numbered items are as described with respect to FIG. 2. The separation system 300 receives a production fluid 204 through a conduit from the wellhead 202. The separation system 300 may include a flocculant feed system 302, e.g., comprising a flocculation stream 106 of FIGS. 1 and 2, that adds a flocculating agent or flocculant 304 to the conduit (e.g., pipe) conveying the production fluid 204 from the wellhead 202. The conduit conveying the production fluid from the wellhead 202 may have an optionally selected nominal diameter, e.g., between about 6 inches to about 24 inches, between about 8 inches to about 12 inches, or about 10 inches, and the conduit conveying the flocculant 304 to the production fluid 204 may have an optionally selected nominal diameter, e.g., between about 0.5 inches to about 8 inches, between about 1 inch to about 4 inches, or about 2 inches. Thus, a conduit tee of 10-inch by 2-inch, or a 2-inch tap on the 10-inch line, may be employed as the interface of the flocculant 304 addition to the production fluid 204.

The flocculant feed system 302, which may be referred to as a flocculant feed structure, a flocculant feed apparatus, a flocculant feed complex, or a flocculant feed arrangement, may receive a flocculant 304' from intermediate storage on a collection platform 306 (e.g., a FPSO unit), e.g., residing on a surface 308. In some embodiments, the flocculant 304' may be substantially the same as the flocculant 304 or may comprise a premix flocculant solution. In other embodiments, the flocculant feed system 302 may perform some mixing, processing, or addition, e.g., of water, oil, and/or sand, to the flocculant 304' to produce the flocculant 304.

Adding the flocculant 304 to the production fluid 204 creates a separation mixture or feed 310 that may be sent to an asphaltenes separator 312. Flow shear forces in the conduit conveying the separation feed 310 to the separator 312 may advance mixing of the production fluid 204 with the flocculant 304. In addition, the separation feed 310 may optionally (depicted with dashed lines) flow through a mixer 314 to further advance mixing of the production fluid 204 with the flocculant 304. The mixer 314 may be an agitated vessel or an inline mixer such as a static mixer, and so forth. The flow shear forces and the optional mixer 314 may provide mixing energy of flocculation, thereby impacting the number of particle collisions between asphaltenes and the efficiency of the collisions. In some examples, the mixing can be adjusted to produce a desired amount of asphaltenes flocculated particles. An insufficient mixing of the production fluid stream 204 and flocculant 304 can impair the formation of flocs because there will be fewer contacts between asphaltenes particles. Conversely, overmixing the particles may impair the formation of flocs due to excessive collisions.

As a result of the asphaltenes flocs having voids filled with production fluid 204, and the clusters having a similar density to the production fluid 204, the production fluid 204 stream may optionally bypass or avoid subsea separation and instead be processed to remove the solid asphaltenes at surface facilities. However, at separation, whether subsea or at a surface facility, a density difference between the asphaltenes solids versus the production fluid 204 may be beneficial.

The separator 312 may be a separation system, a separator system, a plurality of separators, a separator structure, a separator apparatus, a separator complex, a separator arrangement, and so forth, and may comprise a hydrocyclone, a filter or filtration system, a clarifier, or a settling system. The product discharging from the separator 312 may be a wet product 316 having production fluid including water and a reduced amount of or substantially no asphaltenes. The removed asphaltenes stream 318 may include sand and may be conveyed to the platform 306 for additional processing and/or storage.

The wet product 316 may be optionally sent to a water separator 320. The water separator 320 may be an oil/water separator that removes a water stream 322 from the production fluid and discharges an at least partially dehydrated product 324 including the production fluid with less or substantially no water. Examples of the water separator 320 include a cyclone, centrifugal system, filter, and so on. The at least partially dehydrated product 324 (e.g., production fluid) may be conveyed to the platform 306 or other surface facilities for additional processing and/or storage. In particular, the water stream 322 may be a water source for a hydrotransport of the particles and clusters of asphaltenes stream 318 (and, in some embodiments, sand) from the asphaltenes separator 312 to the platform 306 or to other surface facilities for additional processing and/or storage. The combined stream of asphaltenes stream 318 and water stream 322 is indicated by the reference numeral 326.

Figure 4:
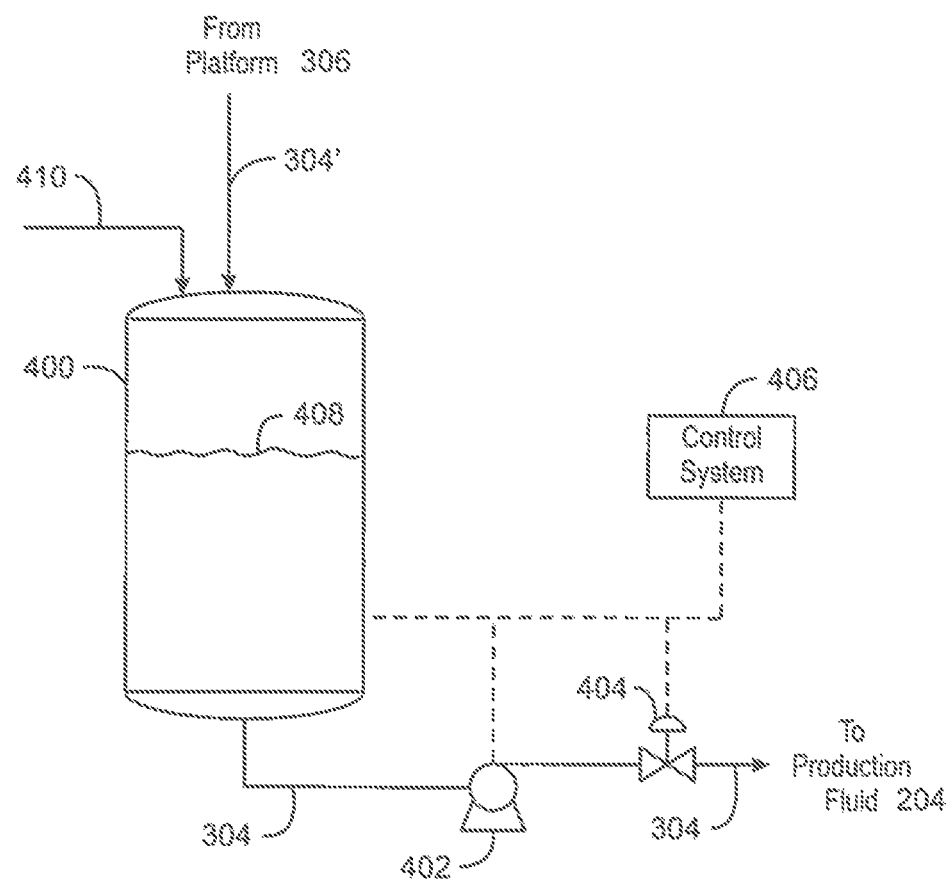
FIG. 4 is a schematic diagram of an example of the flocculant feed system of FIG. 3.

FIG. 4 is a schematic diagram of the flocculant feed system 302 of FIG. 3. The flocculant feed system 302 may include a feed vessel 400, pump 402, e.g., a centrifugal pump, positive displacement pump, etc., and a control valve 404, and may rely on a control system 406 to provide control signals to the control valve 404 and/or the pump, e.g., to modulate addition of the flocculant 304. The control valve 404 may actuate in response to a control signal from the control system 406 based on reaching a predetermined feed set point, a back pressure, or another sensed parameter. The control system 406 may be a distributed control system (DCS), programmable logic controller (PLC), or other type of computing system and instrumentation. The control system 406 may facilitate management and control of other subsea and platform operations in addition to the flocculant feed system 302.

A level 408 of flocculant 304 may be maintained in the feed vessel 400, e.g., as controlled by the control system 406. The feed vessel 400 may be one or more feed vessels that receive one or more flocculant 304' types from the platform 306 of FIG. 3.

In some embodiments, oil and/or water may be added to the feed vessel 400, as indicated by the arrow 410, to mix with flocculant 304' in the vessel 400. If so, the vessel 400 may have an agitator (not shown) to promote mixing of the oil and/or water with the flocculant. In another example, the contents of the feed vessel 400 having the added oil and/or water may be circulated through a recirculation loop (not shown) from the pump 402 discharge to the vessel 400 to mix the oil and/or water with the flocculant.

In examples where more than one flocculant 304' is utilized, the different flocculant 304' types may be added together from the feed vessel 400 to the downstream production fluid 204. On the other hand, the different flocculant 304' types may be added separately from respective feed vessels 400 to the downstream production fluid 204. If so, the different flocculant 304 types may be added at different locations of the conduit conveying the production fluid 204. These and other variations will be apparent to those of skill in the art and are considered within the scope of the present disclosure.

Figure 5:
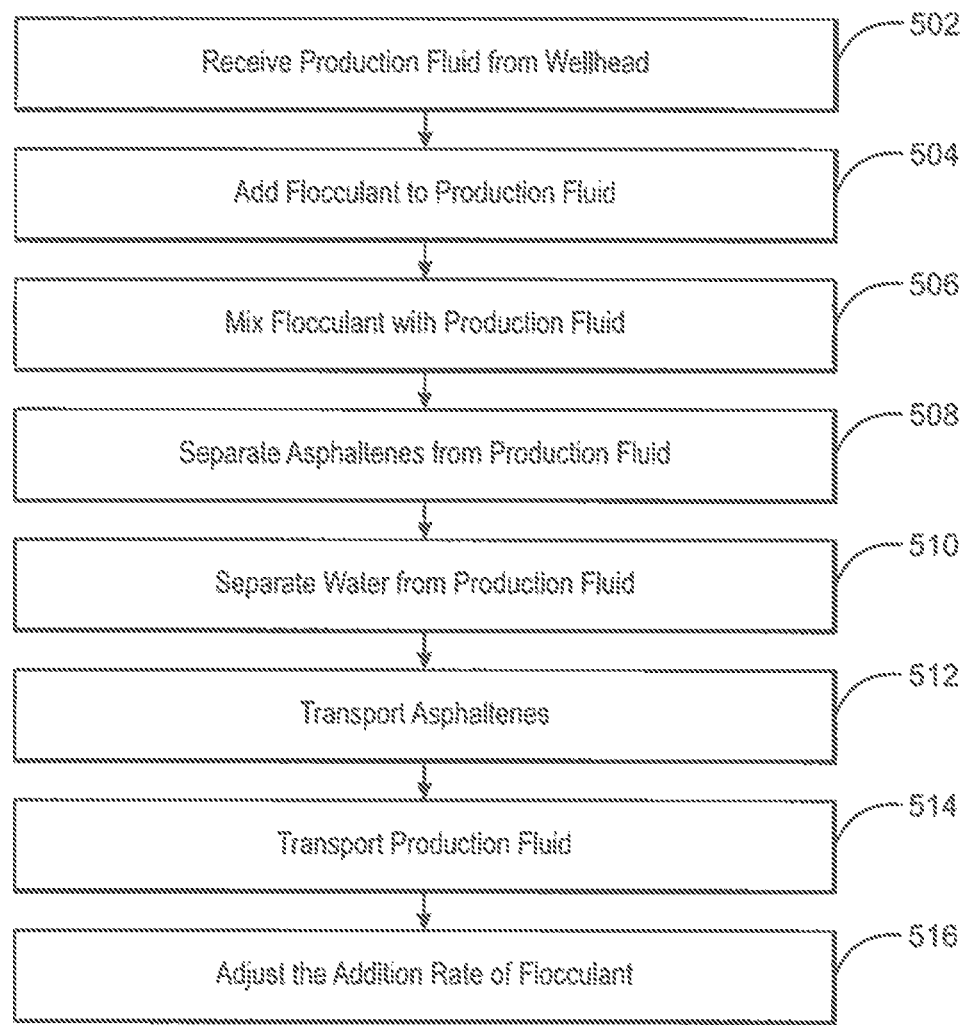
FIG. 5 is a block flow diagram of a method of separating asphaltenes from production fluid.

FIG. 5 is a block flow diagram of a method 500 for separating asphaltenes from a production fluid. In various embodiments, the systems 200 and 300 discussed above with regard to FIGS. 2 and 3, respectively, may be used to implement the method 500. At block 502, the method includes receiving a production fluid discharging from a wellhead. The production fluid may including hydrocarbon, such as oil and natural gas, and also asphaltenes, sand, water, and so forth. The wellhead may be a subsea wellhead, an on-shore wellhead, and so on. At block 504, a flocculating agent or flocculant is added to the flowing production fluid. The flocculant may be added via a flocculant conduit (e.g., umbilical, tubing, small piping, etc.) conveying the flocculant to a relatively large conduit flowing the production fluid. At block 506, the flocculating agent or flocculant is mixed with the production fluid. In some examples, adequate mixing may be provided via flow shear forces of the fluid flowing in the conduit, one or more mixers, e.g., inline mixers, may be employed agitators, or combinations thereof. The separator may be disposed at a specified distance downstream from the flocculant injection point selected to permit adequate mixing time and/or flow length.

The conduit and any mixer may be configured to give the level of mixing and residence time for the asphaltenes to reach a desired level of flocculation within the production fluid stream. For an in-line agitated vessel, the volume of the vessel and the speed of the agitator, and the like, may be specified.

At block 508, the asphaltenes are separated from the production fluid. The asphaltenes can be separated using many different techniques, including, for example, a hydrocyclone. This separation can be performed subsea or at the surface. If the separation is performed at the surface, the production fluid with flocculated asphaltenes is conveyed to surface facilities. On the other hand, for subsea separation of the flocculated asphaltenes from the production fluid, a separator is disposed subsea to separate the flocculated asphaltenes from the production fluid stream. In general, the production fluid is processed to achieve separation of asphaltenes from the production fluid.

At block 510, water can optionally be separated from the production fluid. This separation can be performed, for example, also through a cyclone, or a filter, and so forth. This additional separation can occur subsea or at the surface. In certain embodiments, the water is separated from the production fluid already processed to remove asphaltenes, as at block 508. In some examples, the separated water is utilized in the hydrotransport of asphaltenes.

At block 512, the flocculated asphaltenes are transported. For subsea separation of flocculated asphaltenes, the asphaltenes may be transported to a floating platform at the surface. As indicated, the water separated at block 510 may be utilized in the hydrotransport of the asphaltenes. The flocculated asphaltenes may be transported to storage or additional processing.

At block 514, the processed production fluid is transported. For subsea separation of flocculated asphaltenes from the production fluid, the production fluid with less or substantially no asphaltenes may be transported to the surface. For additional subsea separation of water from the production fluid, the production fluid with less or no water may be transported to the surface. The production fluid may be transported to surface facilities for additional processing and storage. The wellhead pressure may be used as the motive force for conveying the production fluid. Further, pumps may be optionally employed to provide motive force for conveyance of the production fluid.

At block 516, the addition rate of flocculant to the production fluid is adjusted in response to flocculation and separation performance. For example, in response to insufficient flocculation of asphaltenes and insubstantial agglomeration of asphaltenes, additional flocculating agent can be added to the system to induce more flocculation of asphaltenes. Moreover, the addition rate of the flocculant may be adjusted to alter morphology of the flocculated asphaltenes, to increase efficiency of separation of the flocculated asphaltenes from the production fluid in a separator, and so forth. A control system, pump, control valve, and the like, may facilitate adjustment of the addition rate of the flocculant to the production fluid.

The process flow diagram of the method of FIG. 5 is not intended to indicate that the actions of the method 500 are to be executed in any particular order, or that all of the actions of the method 500 are to be included in every case. Further, any number of additional actions not shown in FIG. 5 may be included within the method 500, depending on the details of the specific implementation.

Figure 6:
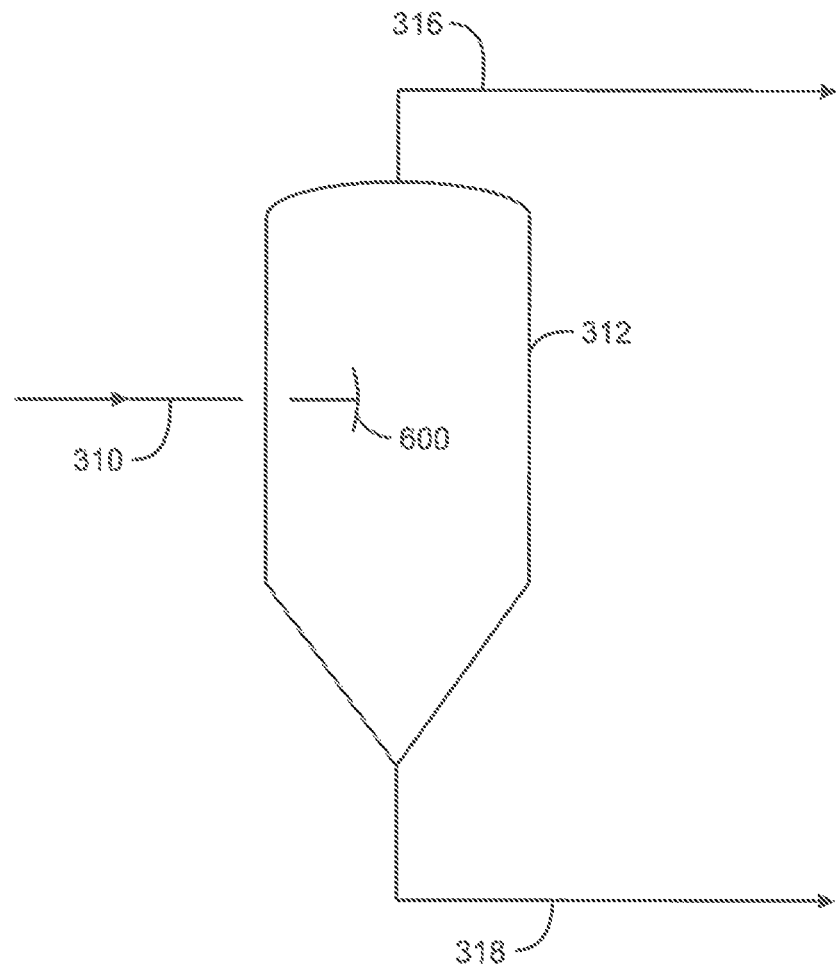
FIG. 6 is a schematic diagram of the asphaltenes separator of FIG. 3.

FIG. 6 is a diagrammatical representation of an example of the separator 312 of FIG. 3. In this example, the separator 312 is a hydrocyclone. The separation feed 310, e.g., the separation feed 310 of FIG. 3, having the production fluid 204 with flocculated asphaltenes enters the separator 312. The entry of the separation feed 310 to the hydrocyclone separator 312 may be a tangential entry, as indicated by the curve 600. In other words, the hydrocyclone may have, for example, a feed nozzle configured to give a tangential entry. In the hydrocyclone, the flocculated and agglomerated asphaltenes (and any sand) are separated from the production fluid 204, e.g., via centrifugal forces and the density difference of the asphaltenes and sand clusters versus the production fluid 204. In the illustrated embodiment, a product 316 of the production fluid with less or substantially no asphaltenes discharges overhead from the hydrocyclone. The flocculated and agglomerated asphaltenes and sand clusters may be discharged as a remove asphaltenes stream 318, e.g., from a bottom portion of the hydrocyclone.

The diagram of FIG. 6 is not intended to indicate that the separator 312 is to include all of the features shown in FIG. 6. Further, any number of additional features may be included within the separation system 600, depending on the details of the specific implementation. Moreover, again, a hydrocyclone is only given as an example of a separator 312 in FIG. 6. Other types of separators and unit operations may be employed as the separator 312 to remove flocculated and agglomerated asphaltenes (and sand) from the production fluid 204.

The conditions for inducing precipitation and flocculation of asphaltenes in production fluid can be influenced and advanced by the techniques discussed herein. Placing the production fluid into an unstable region of temperature and pressure for asphaltenes precipitation can encourage asphaltenes particles to precipitate in the production fluid.

Further, the addition of flocculant to the production fluid can promote precipitation via flocculation of asphaltenes particles, including with the production fluid in a traditional stable region of pressure and temperature not typically giving asphaltenes precipitation, and/or in an unstable region of asphaltenes deposition. Furthermore, the flocculating agent or flocculant may beneficially promote formation of larger clusters of asphaltenes within the production fluid, thus promoting more effective removal of the asphaltenes. Such may also promote flow assurance, as fewer asphaltenes particles will adhere to conduit walls because floc clusters are formed.

Figure 7:
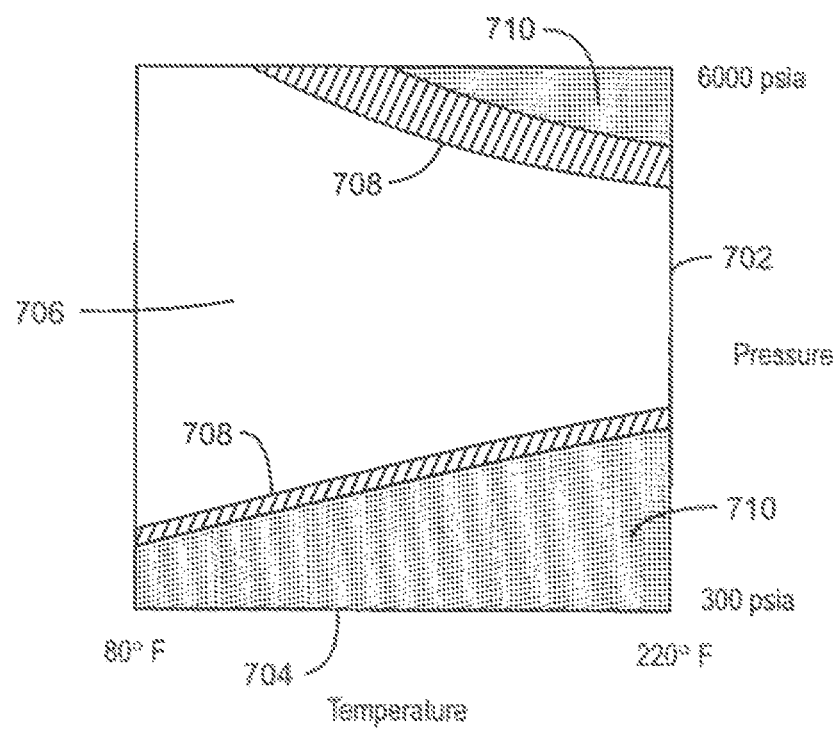
FIG. 7 is a phase diagram of asphaltenes in production fluid as a function of temperature and pressure.

FIG. 7 is an exemplary phase diagram 700 for asphaltenes in production fluid, depicting phases of asphaltenes as a function of pressure 702 and temperature 704 of the production fluid. The depicted pressure-temperature regions of the production fluid with asphaltenes indicates stability (or lack thereof) of the asphaltenes in the production fluid. In the illustrated example, the pressure 702 ranges linearly from about 300 pounds per square inch absolute (psia) (about 2,068 kilopascals (kPa)) to about 6,000 psia (about 41,369 kPa). In this example, the temperature 704 ranges linearly from about 80° F. (about 27° C.) to about 220° F. (about 93° C.). Of course, other pressure and temperature values and ranges may be considered.

Further, differing asphaltenes compositions may behave differently than depicted in FIG. 7. Indeed, the phase diagram 700 is only given as exemplary for discussion purposes of general concepts of asphaltenes phase behavior, and not intended to limit embodiments of the present techniques. Other asphaltenes phase diagrams, temperature ranges, pressure ranges, and so on, are applicable.

In the phase diagram 700, an "unstable" region 706 represents conditions for the asphaltenes molecules precipitating from the production fluid. The "stable" regions 710 represent conditions for asphaltenes particles remaining dissolved or suspended in the production fluid. The "potentially unstable" regions 708 represent conditions at which asphaltenes molecules may begin to precipitate from the production fluid solution. The notation for the regions is given by a legend 712 of the exemplary phase diagram 700.

Deposition of asphaltenes and associated fouling on equipment and piping is generally more likely to occur in the unstable region 706 and potentially unstable regions 708, in comparison to a production fluid with asphaltenes operating in the stable region 710. Evaluating asphaltenes stability can help to predict and avoid flow assurance issues. Production fluid in a reservoir at relatively high temperature and pressure upstream of a wellhead may typically be in the stable region 710. As the production fluid passes through a wellhead from the reservoir, the production fluid may be subjected to a pressure drop and temperature drop across the wellhead that places the production fluid into unstable region 706. In embodiments discussed herein, the flocculant addition and flocculating of asphaltenes may be implemented with the production fluid flowing in the stable region 710 and/or unstable region 706. In examples, the asphaltenes react with the available flocculant while the production fluid is in the unstable region 706.

While the present techniques may be susceptible to various modifications and alternative forms, the embodiments discussed above have been shown only by way of example. However, it should again be understood that the techniques are not intended to be limited to the particular embodiments disclosed herein. Indeed, the present techniques include all alternatives, modifications, and equivalents falling within the true spirit and scope of the appended claims.

What is claimed is:

1. A method for separating asphaltenes from a production fluid comprising:
   receiving the production fluid from a wellhead, the production fluid comprising hydrocarbon and asphaltenes;
   adding a flocculation stream to the production fluid, wherein the flocculation stream comprises an oil-soluble polymer or a water-soluble polymer, or both;
   mixing the flocculation stream with the production fluid to precipitate asphaltene flocs flowing in the production fluid; and
   separating the asphaltene flocs from the production fluid.

2. The method of claim 1, wherein mixing comprises providing sufficient residence time between the addition and the separation to obtain the desired asphaltene flocs, flowing the flocculation stream with the production fluid through a mixer, or both.

3. The method of claim 1, comprising reducing pressure of the production fluid to precipitate the asphaltenes to promote formation of the asphaltenes particles.

4. The method of claim 1, further comprising adjusting an addition rate of the flocculant stream.

5. The method of claim 4, wherein the addition rate is adjusted to promote a density difference between the asphaltene flocs and the production fluid.

6. The method of claim 4, wherein the addition rate is adjusted to maintain a flocculant level in a feed vessel or in response to performance of the separating of asphaltene flocs from the production fluid.

7. The method of claim 1, wherein the wellhead comprises at least one subsea wellhead, further comprising transporting the production fluid to a surface facility.

8. The method of claim 1, further comprising pumping the production fluid to a surface facility when wellhead pressure does not provide sufficient motive force for conveying the production fluid to the surface facility.

9. The method of claim 1, wherein the step of adding the flocculation stream to the production fluid is accomplished using a flocculant feed system that comprises a flocculant feed vessel and a flocculant feed pump.

10. The method of claim 1, further comprising adding at least two different flocculants to the production fluid.

11. The method of claim 1, further comprising adding sand to the production fluid.

12. The method of claim 11, further comprising selecting the sand grain size to improve flocculation, to reduce sedimentation, or both.

13. The method of claim 1, wherein the flocculation stream and the production fluid are mixed in an in-line mixer.

14. The method of claim 9, wherein the flocculant feed system is configured to add flocculant to the production fluid in a pressure range from about 300 pounds per square inch absolute (psia) (about 2,068 kilopascals (kPa)) to about 6000 psia (about 41,369 kPa) and a temperature range from about 80° F. (about 27° C.) to about 220° F. (about 93° C.).

15. The method of claim 1, wherein the flocculant is a water-soluble polymer, and wherein the water-soluble polymer is selected from a group consisting of high-molecular weight polyacrylamides (PAM), hydrolyzed polyacrylamide (HPAM), and nonionic polyethylene oxide homopolymer.

16. The method of claim 1, wherein the step of adding the flocculation stream to the production fluid is accomplished by adding the flocculation stream to a conduit that transports the production fluid from the wellhead to a location where the asphaltene flocs are separated from the production fluid.

17. The method of claim 16, wherein the step of separating the asphaltene flocs from the production fluid is accomplished using an asphaltenes separator configured to:
  receive the production fluid;
  remove the asphaltene flocs from the production fluid;
  discharge an asphaltenes stream comprising the asphaltene flocs; and
  discharge a product comprising the production fluid.

18. The method of claim 17, wherein the asphaltenes stream comprises sand removed from the production fluid by the asphaltenes separator.

19. The method of claim 17, wherein the product comprising production fluid discharged from the asphaltenes separator is substantially free of asphaltenes.

20. The method of claim 17, further comprising removing water from the product using a water separator configured to receive the product and to remove water from the product.

21. The method of claim 20, further comprising conveying the asphaltene flocs from the asphaltenes separator using a hydrotransport system, wherein the hydrotransport system is configured to utilize the water removed from the product by the water separator.

22. A method for separating asphaltenes from production fluid, comprising; receiving the production fluid from a subsea wellhead, the production fluid comprising hydrocarbons and asphaltenes; adding a flocculation stream to the production fluid; mixing the flocculation stream with the production fluid to precipitate asphaltene flocs flowing in the production fluid; separating the asphaltene flocs from the production fluid; removing a first portion of water from the production fluid prior to transporting the production fluid to the surface facility; and removing a second portion of water from the production fluid at the surface facility.

* * * * *